May 25, 1965 — B. A. SHOOR — 3,185,869

TRANSDUCER

Filed Dec. 1, 1961

INVENTOR.
BERNARD A. SHOOR
BY Reed Lawlor
ATTORNEY

United States Patent Office 3,185,869
Patented May 25, 1965

3,185,869
TRANSDUCER
Bernard A. Shoor, Pasadena, Calif., assignor to Endevco Corporation, Pasadena, Calif., a corporation of California
Filed Dec. 1, 1961, Ser. No. 156,312
9 Claims. (Cl. 310—8.4)

This invention relates to electromechanical transducers and more particularly to improvements that reduce the variation in sensitivity of piezoelectric transducers that would otherwise occur under varying temperature conditions.

In many modern transducers, piezoelectric elements are employed for converting mechanical forces such as pressures and accelerations into electric signals. Such transducers are usually employed for detecting and measuring variable forces applied to the transducer. Such a transducer is usually provided with electric conductors for connection to means for detecting electric signals developed across parts of the piezoelectric element. The conductors themselves are then connected to an amplifier or other device employed for detecting either the voltage developed across those parts of the piezoelectric element or the electric charge developed by the piezoelectric element.

One type of transducer is designed to respond to the acceleration of an object to which the transducer is attached. Though the invention is applicable to many other types of transducers, it will be described herein with particular reference to accelerometers.

A typical piezoelectric accelerometer of the type in question employs a piezoelectric element mounted on a base member which is attached to the object undergoing test and also includes a mass or inertia member mounted on the opposite side of the piezoelectric element from the base. The piezoelectric element is polarized in such a direction that when it is stressed between the inertia member and the mass member, an electric field is generated between various points thereof such as points on opposite faces. When the object subjects the base to an alternating acceleration, the piezoelectric element is subjected to alternating stresses that cause alternating electric fields to be generated in the accelerometer.

It has been found that the amplitude of the alternating voltage developed across the piezoelectric element when the accelerometer is subject to an alternating acceleration of constant amplitude is not constant but depends on the temperature of the piezoelectric element. Likewise, it is observed that the amount of electric charge developed varies with temperature.

Accordingly, the principal object of this invention is to provide an improved piezoelectric transducer which has a sensitivity, whether it be voltage sensitivity or charge sensitivity, as the case may be, that varies with temperature less than piezoelectric transducers heretofore available.

In accordance with this invention, a capacitor is connected electrically with the crystal for reducing the temperature variation of sensitivity. More particularly, a capacitor having a negative temperature coefficient of capacitance is connected in parallel with the piezoelectric element and is mounted in heat exchange relationship therewith to reduce the temperature variations in the voltage sensitivity of the transducer. Also, a capacitor having a negative temperature coefficient of capacitance is connected in series with the piezoelectric element and is mounted in heat exchange relationship therewith to reduce the temperature variations in the charge sensitivity of a transducer. By employing two temperature responsive capacitors, one connected in series and the other connected in parallel with the piezoelectric element, it is even possible to provide a single accelerometer in which both the voltage sensitivity and the charge sensitivity are substantially independent of temperature changes.

In the best mode of practicing the invention, the piezoelectric element and the capacitor are mounted within a common case. In this way both the piezoelectric element and the capacitor are subjected to the same temperature and a compact unit is provided in which a capacitor installed at the factory remains permanently associated with the piezoelectric element while in use.

The foregoing and other objects of the invention are attained in various embodiments of the invention that are described hereinafter and are illustrated in the accompanying drawings in which.

Figure 1:
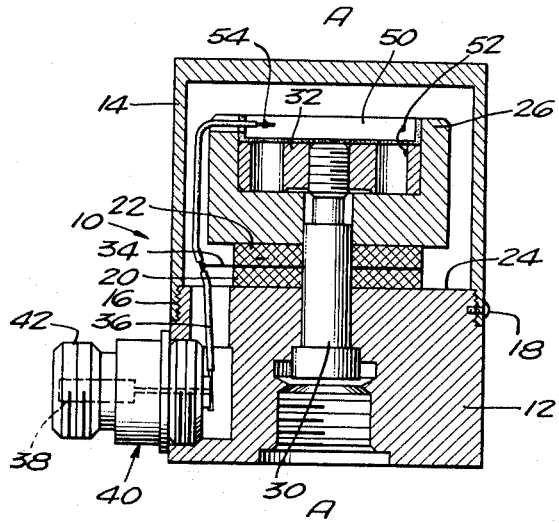
FIG. 1 is a cross-sectional view of a piezoelectric accelerometer employing features of this invention.

In the drawings, and particularly in FIG. 1, there is illustrated an accelerometer 10 embodying the features of this invention. The accelerometer includes a cylindrical case comprising a base member 12 and a cap member 14 that are secured together as by means of threads 16.

In this case the piezoelectric element comprises a pair of annular piezoelectric units or discs 20 and 22 mounted within the case between a flat floor surface 24 and an inertia or mass member 26. A screw 30 extending through a central countersunk bore in the base 12 cooperates with a nut 32 in a recess in the upper end of the inertia member 26 to apply an axial compressive force to the piezoelectric elements along the axis A—A of the case. The base 12, the cap 14, the inertia member 26, the screw 30, and the nut 32 are all composed of metal.

The two piezoelectric units 20 and 22 are composed of ceramic piezoelectric material such as barium titanate or lead metaniobate or a mixture of lead zirconate and lead titanate.

The upper surface of the upper piezoelectric unit is in direct electrical contact with the inertia member so that it is electrically connected to the base 12. The lower surface of the lower piezoelectric unit 20 is in direct contact with the horizontal surface 24 of the base 12 so that it too is electrically connected to the base 12. A foil electrode 34 that is mounted between the two piezoelectric units is connected to an electrical conductor 36 that leads to an insulated central contact element 38 of a socket 40. The outer, threaded member 42 of the socket is directly connected to the base 12. The socket is of a kind that is adapted for connection to a coaxial cable.

Figure 3:
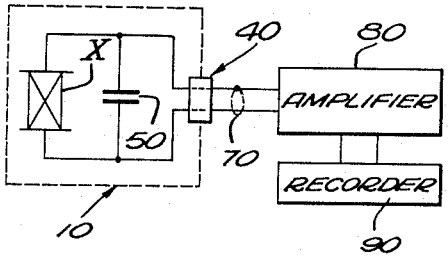
FIG. 3 is a schematic diagram of a form of the invention in which a capacitor is connected in parallel with the piezoelectric element.

In practice, a coaxial cable 70 is electrically connected to the socket 40 for transmitting electric signals from the accelerometer to an amplifier 80 and recorder 90 that is connected to the output of the amplifier as indicated in FIG. 3. The amplifier 80 may be a voltage amplifier in which the voltage produced at the output is proportional to the voltage impressed on the input or it may be a charge amplifier in which the voltage generated at the output is proportional to the electric charge on the piezoelectric element.

In all the specific examples considered herein it is assumed that the cable has a capacitance of 100 μμf. and the characteristics described apply to the accelerometer when connected to such a cable.

In the embodiment of the invention shown in FIG. 3 a capacitor 50 is cemented in the recess in the upper end of the inertia member 26 above the nut 32. And terminal 52 of the capacitor is connected to the nut and hence to the outer portion 42 of the socket 40. The other terminal 54 is electrically connected to the foil electrode 34 and to the conductor 36 and hence to the central terminal 38 of the socket 42.

When the accelerometer 10 is subjected to an alternating acceleration having a component along the axis A–A, the piezoelectric element formed by the two piezoelectric discs 20 and 22 is alternately compressed and relaxed between the base 12 and the inertia member 26 causing an alternating electric potential to be generated between the two terminals 38 and 42 of the socket 40.

The sensitivity of the accelerometer is a transfer ratio that may be either a voltage transfer ratio or a charge transfer ratio. The ratio of the amplitude of the alternating voltage generated by the transducer to the amplitude of acceleration is called voltage sensitivity. The ratio of the amplitude of the charge generated by the transducer to the amplitude of acceleration is called charge sensitivity. It has been found experimentally that the sensitivity of a piezoelectric accelerometer that does not employ a capacitor 50 and the effective capacitance of the piezoelectric element of such an accelerometer depends on the temperature of the accelerometer.

Figure 2B:
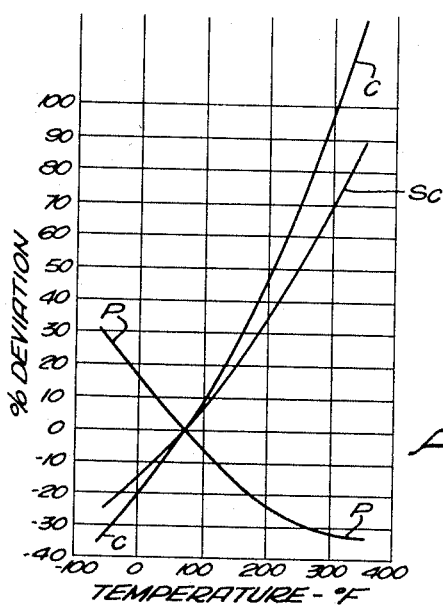
FIGS. 2a and 2b are graphs used in explaining the invention.
Figure 2A:
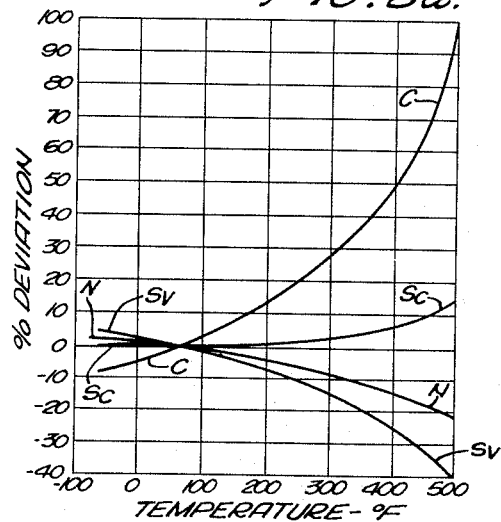

In FIG. 2a, graphs are shown that indicate how the capacitance C, the charge sensitivity $S_c$, and the voltage sensitivity $S_v$, of a typical piezoelectric accelerometer, varies with temperature. Referring to FIG. 2a, it will be noted that when the temperature changes from normal room temperature of 70° F. to a high temperature of 500° F., the charge sensitivity increases 15% and the voltage sensitivity decreases 40%. At the same time the effective capacitance of the piezoelectric element increases over 100%.

There are numerous ways of reducing the changes of sensitivity that would otherwise occur with temperature in accordance with this invention. In the simplest way, a capacitor 50 having a zero (or low) temperature coefficient of capacitance is connected in parallel with the piezoelectric element X as shown in FIG. 3. In one particular case in which the capacitance of the piezoelectric element had values of 1530 μμf., 1927 μμf., and 3052 μμf. at 70° F., 300° F., and 500° F., respectively, as shown in graph C of FIG. 2a and in which a shunt capacitor having a constant capacitance of about 1400 μμf. was employed, the change in voltage sensitivity with temperature was reduced by a factor of about one-half as indicated in the graph N of FIG. 2a. In this case a total constant capacitance of about 1500 μμf. was connected across the accelerometer the capacitance being composed in part by 100 μμf. provided by the cable and about 1400 μμf. provided by the swamping capacitor 50 within the case.

For best effects, however, a capacitor is employed that has a negative temperature coefficient of capacitance, that is, a capacitor is employed that has a capacitance that decreases with temperature. For example, in one particular case an accelerometer had a capacitance and a charge sensitivity and voltage sensitivity that varied with temperature in the manner illustrated by the graphs C and $S_c$, respectively, in FIG. 2b. The piezoelectric element had capacitance values of 400 μμf., 622 μμf., 930 μμf. and 1240 μμf. at −65° F., 70° F., +200° F., and +300° F., respectively. When a shunt capacitor was employed that had a capacitance that varied with temperature, as shown in graph P, the voltage sensitivity was constant within about ±2% over a temperature range extending from −65° F. to +350° F. The capacitor chosen for this purpose had a capacitance of 100 μμf. at 70° F.

To obtain constancy of voltage sensitivity, a swamping capacitor 50 is selected that had a capacitance $C_{ST}$ at any temperature T given by the equation $$C_{ST} = \frac{Q_T}{Q_{70}}(C_{70} + C_{S70} + 100) - C_T - 100 \qquad (1)$$

Where $Q_T$ = charge sensitivity at temperature T
$Q_{70}$ = charge sensitivity at 70° F.
$C_T$ = capacitance of piezoelectric element at temperature T
$C_{70}$ = capacitance of piezoelectric element at 70° F.
$C_{S70}$ = capacitance of swamping capacitor at 70° F.

The values of capacitance are given in μμf.

In the particular case illustrated in FIG. 2b, the graph for voltage sensitivity has not been shown though it was shown in the case of FIG. 2a. In any event, when connected to a cable having a capacitance of 100 μμf. the voltage sensitivity $S_v$, and charge sensitivity $S_c$, and the capacitance C of the piezoelectric element are related by the following equation:

$$S_v = \frac{S_c}{C+100} \qquad (2)$$

The numeral 100 in Equations 1 and 2 above and in Equation 3 hereafter represents the capacitance of the cable. It is thus seen that the values of the capacitance of the shunt capacitor required to obtain constancy of voltage sensitivity depends not only on the temperature characteristic of the capacitance of the piezoelectric element but also on how the charge sensitivity varies with temperature. In practice, a value $C_{S70}$ of capacitance of the shunt capacitor at 70° is chosen and then the values needed for uniformity are calculated from Equation 1. The value of $C_{70}$ is made as small as conveniently possible while still satisfying the requirements of Equation 1 in order to minimize voltage loss introduced by the addition of the capacitor. Then a capacitor having the desired characteristic is selected from catalogues or experimentally.

Figure 4:
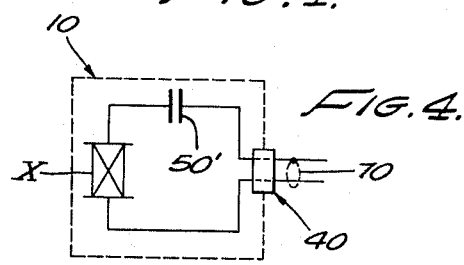
FIG. 4 is a schematic diagram of a form of the invention in which a capacitor is connected in series with the piezoelectric element.

In a third way of employing the invention, a negative temperature coefficient capacitance 50' is connected in series between one terminal of the piezoelectric element and one conductor of the coaxial cable 70, as illustrated in FIG. 4. In this case too a negative temperature coefficient capacitor is employed to counteract the effects of temperature in varying the capacitance and charge sensitivity of the piezoelectric element.

In this case optimum results are obtained by selecting a series capacitor for which the capacitance varies with temperature in the manner indicated by the following equation:

$$C_{ST} = \frac{1}{\dfrac{Q_T}{Q_{70}}\left(\dfrac{C_{70}+C_{S70}+100}{C_{S70}+100}\right)-1} - 100 \qquad (3)$$

In this case too a value of capacitance $C_{S70}$ is chosen arbitrarily and the desired characteristic is calculated from Equation 2. The value of $C_{70}$ is made as large as conveniently possible while still satisfying the requirements of Equation 3 in order to minimize charge loss introduced by the addition of the capacitor. And then a capacitor is selected that has such a characteristic.

Figure 5:
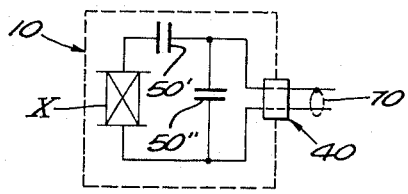
FIG. 5 is a schematic diargram of a piezoelectric accelerometer employing both a series capacitor and a shunt capacitor.

In still a fourth form of the invention a capacitor 50' is connected in series between one terminal of the piezoelectric element X and one conductor of the cable 70, and another capacitor is across the two conductors of the cable 70. By employing both a series capacitor and a shunt capacitor in the case, as illustrated in FIG. 5, a piezoelectric accelerometer is provided which has both a voltage sensitivity and a charge sensitivity that is substantially constant throughout a wide temperature range.

In all cases the capacitors are mounted within the case of the accelerometer. And in all cases where the capacitance varies with temperature, the capacitor or capacitors are mounted in heat exchange relation with the piezoelectric element. In this way the capacitor is always connected with the piezoelectric element with which it was originally connected at the factory. Furthermore, the capacitor is always substantially at the same temperature as the piezoelectric element, thus assuring repeatable temperature compensation throughout the temperature range for which the accelerometer has been designed.

Though the invention has been described above only in connection with its application to piezoelectric accelerometers, it will be understood that it may also be applied to other transducers employing piezoelectric elements for detecting physical phenomena that vary in amplitude as a function of temperature. It is therefore to be understood that the invention is not limited to the specific embodiments thereof that have been described herein, but may be embodied in many other forms within the scope of the appended claims.

The invention claimed is:

1. In a transducer:
a piezoelectric element mounted within a case,
a capacitor in the case,
the piezoelectric element and the capacitor being electrically connected to terminals adapted for connection to an external circuit,
the temperature coefficient of the capacitance of the capacitor being low compared with the temperature coefficient of the voltage sensitivity of the piezoelectric element whereby the transfer ratio of the transducer varies with temperature less than if the capacitor were omitted.

2. In a transducer:
a piezoelectric element mounted within a case and responsive to forces applied to the case, and
a capacitor in the case,
the piezoelectric element and the capacitor being electrically connected to terminals adapted for connection to an external circuit,
the piezoelectric element being responsive to forces applied to the case and generating an electric signal in accordance with such force,
the temperature coefficient of the capacitance of the capacitor being low compared with the temperature coefficient of the voltage sensitivity of the piezoelectric element whereby the magnitude of the signal generated in response to an alternating force applied to the case varies with temperature less than if the capacitor were omitted.

3. In a transducer:
a piezoelectric element mounted within a case,
a capacitor mounted in heat exchange relation with said piezoelectric element,
the piezoelectric element having a transfer ratio that increases with temperature,
and the capacitor having a capacitance that decreases with temperature,
said piezoelectric element and said capacitor being electrically connected to terminals adapted for connection to an external circuit,
the transfer ratio of the transducer varying with temperature less than if the capacitor were omitted.

4. In a transducer:
a piezoelectric element mounted within a case,
a capacitor mounted in heat exchange relation with said piezoelectric element,
the piezoelectric element having an electrical sensitivity varying with temperature,
and the capacitor having a capacitance that varies with temperature,
said piezoelectric element and said capacitor being electrically connected to terminals adapted for connection to an external circuit,
the piezoelectric element being responsive to alternating forces applied to the case and generating an alternating electric signal in accordance with such force,
the magnitude of the signal generated in response to an alternating force applied to the case varying with temperature less than if the capacitor were omitted.

5. A transducer as in claim 4 wherein said capacitor is connected in parallel with said piezoelectric element.

6. A transducer as in claim 4 wherein said capacitor is connected in series with said piezoelectric element.

7. In combination:
a transducer as defined in claim 5 and a voltage amplifier connected by a cable to the piezoelectric element of said transducer.

8. In combination:
a transducer as defined in claim 6 and a charge electric amplifier connected by a cable to the piezoelectric element of said transducer.

9. In a transducer:
a piezoelectric element mounted within a case having a pair of external terminals, said piezoelectric element responding to forces applied to said case to generate a voltage and charge having a magnitude substantially proportional to said forces,
capacitor means in the case, said capacitor means comprising a capacitor connected between two points of said piezoelectric element and a second capacitor connected between said point and one of said terminals, the other point of said piezoelectric element being connected to the other terminal,
the values of capacitance of said capacitors varying with temperature whereby both the voltage sensitivity and the charge sensitivity of said transducer varies less with temperature than if the capacitors were omitted.

References Cited by the Examiner

UNITED STATES PATENTS 3,045,131  7/62  Orlacchio _____ 310—8.4
3,060,748  10/62  Schwartz _____ 310—8.9

MILTON O. HIRSHFIELD, *Primary Examiner.*